United States Patent
Gianzero (12) United States Patent (10) Patent No.: US 6,958,610 B2
(45) Date of Patent: Oct. 25, 2005

(54) METHOD AND APPARATUS MEASURING ELECTRICAL ANISOTROPY IN FORMATIONS SURROUNDING A WELLBORE

(75) Inventor: Stanley C. Gianzero, Austin, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 40 days.

(21) Appl. No.: 10/173,528

(22) Filed: Jun. 17, 2002

(65) Prior Publication Data

US 2003/0016020 A1 Jan. 23, 2003

Related U.S. Application Data

(60) Provisional application No. 60/302,823, filed on Jul. 3, 2001.

(51) Int. Cl.$^7$ .............................. G01V 3/18; G01V 3/08

(52) U.S. Cl. ........................ 324/342; 324/338; 324/333

(58) Field of Search ................................ 324/333, 338, 324/339, 341, 342, 343; 702/6, 7, 10, 11

(56) References Cited

U.S. PATENT DOCUMENTS

| | | | | |
|---|---|---|---|---|
| 4,302,722 A | | 11/1981 | Gianzero | ..................... 324/339 |
| 4,302,723 A | | 11/1981 | Moran | ......................... 324/343 |
| 4,553,097 A | * | 12/1985 | Clark | |
| 5,235,285 A | | 8/1993 | Clark et al. | .................. 324/342 |
| 5,966,013 A | * | 10/1999 | Hagiwara | .................... 324/339 |

FOREIGN PATENT DOCUMENTS

| | | |
|---|---|---|
| EP | 0 527 089 A2 | 2/1993 |
| EP | 0 869 376 A2 | 7/1998 |
| WO | WO 00 50926 | 8/2000 |

OTHER PUBLICATIONS

Moran, J. H. and Gianzero, S., 1979, *Effects of formation anistrophy of resistivity–logging measurements*: Geophysics, 44, pp. 1273.

Kuntz, K., and Moran, J. H., S., 1962, *Basic theory of induction logging and application to study two–coil sondes*: Geophysics, 27, pp. 829–858.

Kuntz, K., and Moran, J. H., S., 1958, *Some effects of formation anisotropy on resistivity measurements in boreholes*: Geophysics, 23, pp. 770–794.

Moran, J. H. and Gianzero, S., 1979, *Effects of formation anisotropy of resistivity–logging measurements*: Geophysics, 44, pp. 1276.

Chemali, R., Gianzero, S. and S.M. Su, 1987, *The effect of shale anisotropy on focused resistivity devices*: SPWLA 28th Ann. Logging Symp., paper H.

(Continued)

*Primary Examiner*—Jay Patidar
(74) *Attorney, Agent, or Firm*—Conley Rose, P.C.

(57) ABSTRACT

A logging tool is disclosed having transmitting and receiving antennas to measure formation anisotropy. The antennas may preferably be combinations of toroidal, horizontal electric dipole, and horizontal magnetic dipole antennas. In one embodiment, the tool: (a) induces a current flow in the tubing or drill string traversing the formation in a borehole; (b) measures a signal difference between two receiver antennas on the drill string; (c) determines an apparent conductivity of the formation from the resistive component of the signal difference; and (d) uses the apparent conductivity to calculate an anisotropy coefficient with a knowledge of the horizontal conductivity. The tool may further determine a second apparent conductivity of the formation from the reactive component of the signal difference, and use both apparent conductivities to calculate the anisotropy coefficient and the horizontal conductivity. The vertical conductivity can also be determined from these two calculated values in the usual manner.

50 Claims, 7 Drawing Sheets

OTHER PUBLICATIONS

Anderson, B. et al., 1990, *Response of 2–MHz LWD resistivity and wireline induction tools in dipping beds and laminated formations*: SPWLA 31st Ann. Logging Symp., paper A.

Luling, M. et al., 1994, *Processing and modeling 2–MHz resistivity tools in dipping, laminated, anisotropic formations*: SPWLA 35th Ann. Logging Symp., paper QQ.

Hagiwara, T., 1995, *Induction log analysis of thinly laminated sand/shale formation*: SPE Formation Evaluation, Jun., pp. 86–90.

Hagiwara, T., 1996, *EM log response to anisotropic resistivity in thinly laminated formations with emphasis on 2–MHz resistivity devices*: SPE Formation Evaluation, Dec., pp. 211–217.

Tabarovsky, L., Epov, M., and Kagansky, A., 1977, *Focusing systems of inductance logging in anisotropic media*: Geol. i Geofiz, No. 9.

Xiao, J., Beard, D., and Zhou, Q., 1996, *A practical dipping-effect correction for multiarray induction tools in deviated wells*: SPWLA 37th Ann. Logging Symp., paper R.

Gianzero, S., 1999, *The paradox of anisotropy revisited*: The Log Analyst, vol. 40, No. 6, pp. 485–491.

Gianzero, S. et al., 1985, *A new resistivity tool for measurement–while–drilling*: SPWLA 26th Ann. Logging Symp., paper A.

Kriegshauser, B. et al., 2000, *A new multicomponent induction logging tool to resolve anistropic formations*: SPWLA 41st Ann Logging Symp., Paper D.

British Search Report dated Jan. 28, 2003, Application No. GB 0214674.4 (2 p.).

French Search Report dated Feb. 21, 2003, Application No. FA 620652 (2 p.).

Karinski, A. and Moustaov, A., "Vertical Resistivity Estimation With Toroidal Antennas in Transversely Isotropic Media," SPWLA 42nd Annual Logging Symposium, Jun. 17–20, 2001, paper BB, 14 P.

Karinski, A. and Moustaov, A., "Feasibility of Vertical–Resistivity Determination By the LWD Sonde With Toroidal Antennas for Oil–Base Drilling Fluid, " SPWLA 43nd Annual Logging Symposium, Jun. 2–50, 2002 paper Q, 13 p.

* cited by examiner

METHOD AND APPARATUS MEASURING ELECTRICAL ANISOTROPY IN FORMATIONS SURROUNDING A WELLBORE

CROSS-REFERENCE TO RELATED APPLICATIONS

This application claims priority to U.S. Provisional Patent Application No. 60/302,823 filed on Jul. 3, 2001, and entitled "Method And Apparatus Using Toroidal Antenna for Measuring Electrical Anisotropy." This application is also related to commonly owned U.S. Pat. No. 6,181,138, issued Jan. 30, 2001, and entitled "Directional Resistivity Measurements for Azimuthal Proximity Detection of Bed Boundaries." These references are incorporated herein by reference.

STATEMENT REGARDING FEDERALLY SPONSORED RESEARCH OR DEVELOPMENT

Not applicable.

BACKGROUND OF THE INVENTION

1. Field of the Invention

The present invention generally relates to the measurement of electrical characteristics of formations surrounding a wellbore. More particularly, the present invention relates to a method for determining horizontal and vertical resistivities in anisotropic formations.

2. Description of Related Art

The basic principles and techniques for electromagnetic logging for earth formations are well known. Induction logging to determine the resistivity (or its inverse, conductivity) of earth formations adjacent a borehole, for example, has long been a standard and important technique in the search for and recovery of subterranean petroleum deposits. In brief, the measurements are made by inducing electrical current flows in the formations in response to an AC transmitter signal, and then measuring the appropriate characteristics of a receiver signal generated by the formation current flows. The formation properties identified by these signals are then recorded in a log at the surface as a function of the depth of the tool in the borehole.

It is well known that subterranean formations surrounding an earth borehole may be anisotropic with regard to the conduction of electrical currents. The phenomenon of electrical anisotropy is generally a consequence of either microscopic or macroscopic geometry, or a combination thereof, as follows.

In many sedimentary strata, electrical current flows more easily in a direction parallel to the bedding planes, as opposed to a direction perpendicular to the bedding planes. One reason is that a great number of mineral crystals possess a flat or elongated shape (e.g., mica or kaolin). At the time they were laid down, they naturally took on an orientation parallel to the plane of sedimentation. The interstices in the formations are, therefore, generally parallel to the bedding plane, and the current is able to easily travel along these interstices which often contain electrically conductive mineralized water. Such electrical anisotropy, sometimes called microscopic anisotropy, is observed mostly in shales.

Subterranean formations are often made up of a series of relatively thin beds having different lithological characteristics and, therefore different resistivities. In well logging systems, the distances between the electrodes or antennas are great enough that the volume involved in a measurement may include several such thin beds. When individual layers are neither delineated nor resolved by a logging tool, the tool responds to the formation as if it were a macroscopically anisotropic formation. A thinly laminated sand/shale sequence is a particularly important example of a macroscopically anisotropic formation.

If a sample is cut from a subterranean formation, the resistivity of the sample measured with current flowing parallel to the bedding planes is called the transverse or horizontal resistivity $\rho_H$. The inverse of $\rho_H$ is the horizontal conductivity $\sigma_H$. The resistivity of the sample measured with a current flowing perpendicular to the bedding plane is called the longitudinal or vertical resistivity, $\rho_v$, and its inverse the vertical conductivity $\sigma_v$. The anisotropy coefficient $\lambda$ is defined as:

$$\lambda = \sqrt{\sigma_H/\sigma_v}. \tag{1}$$

In situations where the borehole intersects the formation substantially perpendicular to the bedding planes, conventional induction and propagation well logging tools are sensitive almost exclusively to the horizontal component of the formation resistivity. This is a consequence of the induced currents flowing in horizontal planes in the absence of formation dip or well deviation. Indeed, regarding Galvanic devices, the lack of sensitivity to anisotropy is even more stringent due to the "paradox of anisotropy," which states that any array of electrodes or sensors deployed along the axis of a wellbore in a vertical well is insensitive to the vertical component of resistivity, despite the intuitive expectation to the contrary.

At present, there exists only one commercial instrument that measures the vertical resistivity. B. Kriegshauser, et al., describe this instrument in "A new multicomponent induction logging tool to resolve anisotropic formations," $41^{st}$ Annual Logging Symposium, Society of Professional Well Log Analysts, paper D, pps. 1–14, 2000. This instrument employs multiple multi-component coils (i.e., transmitter and receiver coils having axial and transverse orientations). This instrument may be unduly complex and provide measurements that are difficult to interpret. Further, the design of this wireline instrument may not be adaptable to a measurement while drilling (MWD) implementation. A simpler method and apparatus for measuring vertical resistivity would be desirable.

SUMMARY OF THE INVENTION

The above-described problems are in large part addressed by using a logging tool with antennas configured to measure formation anisotropy. In one embodiment, the method comprises (a) inducing a current flow in the tubing or drill string traversing the formation in a borehole; (b) measuring a signal difference between two toroidal receiver antennas on the drill string; (c) determining an apparent conductivity of the formation from the resistive component of the signal difference; and (d) using the apparent conductivity with an additional measurement of horizontal conductivity to calculate an anisotropy coefficient. The method may further include determining a second apparent conductivity of the formation from the reactive component of the signal difference, and using both apparent conductivities to calculate directly both the horizontal conductivity and the anisotropy coefficient. The horizontal and vertical conductivities can also be determined from the two apparent conductivities. It should be noted that determining the apparent conductivity and/or calculating the anisotropy coefficient as described above may be done by surface processing equipment.

In an alternative embodiment, a horizontal electric dipole may be used as a transmitter, where imposing an alternating voltage on it produces electric fields in the formation, which in turn generate alternating currents. The generated alternating currents are preferably measured to register the amount of resistance and reactance present in the formation. This measurement yields anisotropy data, and horizontal and vertical conductivities. Preferably, at least one horizontal magnetic dipole receiver is used to measure the generated current by measuring the amount of magnetic field it induces. In addition, multiple horizontal magnetic receivers may be used to create a differential signal measurement.

In yet another embodiment, a horizontal magnetic dipole may be used as the transmitter, where imposing an alternating voltage on it produces magnetic fields in the formation, which in turn generate alternating currents. The generated alternating currents are preferably measured to register the amount of resistance and reactance present in the formation. This measurement yields anisotropy data, and horizontal and vertical conductivities. Preferably, at least one horizontal electric dipole receiver is used to measure the generated current by measuring the amount of electric field it induces. In addition, multiple horizontal electric receivers may be used to create a differential signal measurement.

The disclosed methods may provide advantages in determining the parameters of anisotropic earth formations in both wireline applications and/or MWD applications. For example, the tool is expected to work particularly well in high-conductivity formations where the existing induction tools are deficient due to skin effect. Additionally, because the sensitivity to anisotropy is a volumetric effect as opposed to a boundary effect for Galvanic devices, there is a greater sensitivity to anisotropy. In addition due to the fact that the tool operates on straightforward principles, the ease of log interpretation is enhanced. Also, in the case of MWD, the tool design advantageously reduces the borehole and invasion effects on the measurement and enhances the depth of investigation.

BRIEF DESCRIPTION OF THE DRAWINGS

A better understanding of the present invention can be obtained when the following detailed description of the preferred embodiment is considered in conjunction with the following drawings, wherein like parts have been given like numbers.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Terminology

It is noted that the terms horizontal and vertical as used herein are defined to be those directions parallel to and perpendicular to the bedding plane, respectively.

Tool Configuration

Figure 1:
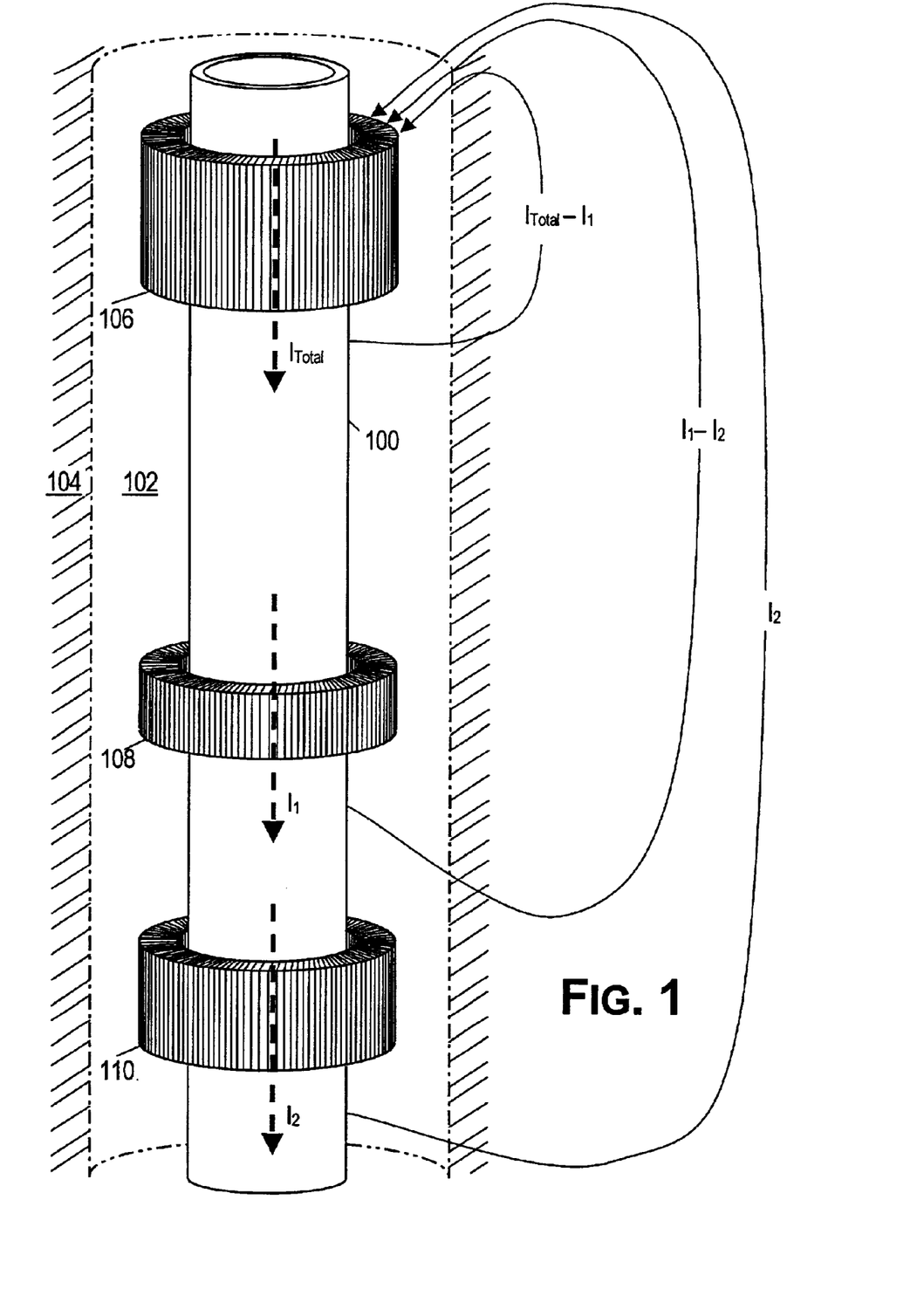
FIG. 1 shows a preferred embodiment of the antenna configuration using toroidal receivers and transmitters.

FIG. 1 shows a logging tool 100 that is part of drillstring located in a wellbore 102 that passes through a formation 104. The tool includes at least one transmitter antenna 106 and at least two receiver antennas 108, 110. The transmitter antenna 106 and receiver antennas 108 and 110 are toroidal antennas, although as explained below the antennas 106, 108, and 110 may include other antenna types. A toroidal antenna has a spirally-wound high-permeability core that forms a closed loop around an electrical conductor. In the logging tool 100, the electrical conductor is preferably a portion of a drill string, but it is not so limited, in fact the logging tool 100 also renders itself to wireline applications. In the preferred embodiment, the core is circular with a generally-rectangular cross section, but other geometries (e.g., a circular cross-section) would also suffice.

The toroidal transmitter antenna 106 operates when an alternating current is supplied to the spiral wire winding around the antenna core. A changing current flow in the winding induces a changing magnetic field in the core, which in turn induces a current $I_{Total}$ in the logging tool 100. The current $I_{Total}$ flows along the logging tool 100 where part of the current $I_{Total}$-$I_1$ radiates into the formation and returns to the drillstring on the opposite side of the transmitter antenna 106, and the rest of the current I, continues to flow in the logging tool 100 through the toroidal receiver 108. The toroidal receivers 108 and 110 operate when a changing current flows along the enclosed electrical conductor, in this case logging tool 100. Current $I_1$ flows along the logging tool 100 and induces a changing magnetic field in the core of receiver 108, which in turn induces a changing voltage that is measured in the winding of the receiver 108. At this point, part of the current $I_1$-$I_2$ radiates into the formation just after the receiver 108 and returns to the drillstring on the opposite side of the antenna 106, and the rest of the current 12 continues along the drillstring to the toroidal receiver 110. The voltage in the winding of toroidal receiver 110 generated as a result of $I_2$ is measured similarly to the voltage measurement of the receiver 108. The logging tool 100 is thereby able to determine the amount of current radiated into the formation in each of two regions. The current $I_2$ that passes through receiver 110 is radiated from the drillstring in the region below receiver 110 (the "bit region"). The current that passes through receiver 108 minus the current that passes through receiver 110 ($I_1$-$I_2$) is radiated from the drillstring in the region between the receivers (the "lateral region"). It should be noted that receiver 108 and receiver 110 are intended to be used in a differential manner such that the voltage difference between the receivers results from the difference in their respective current flows or the difference in their magnetic fields. Thus, the amount of current dissipated into the lateral region can be easily calculated and the width of the lateral region is varied as the distance between the toroidal receivers 108 and 110. Also, note that the toroidal receivers used in a differential arrangement may be sized differently depending upon their relative proximity to the transmitter so as to achieve zero offset. For example, receiver 108 as shown in FIG. 1 is sized smaller than receiver 110 because the magnetic field induced by transmitter 106 is stronger in receiver 108 than in receiver 110 due to their relative distance from the transmitter 106. It should be noted that the although the system described in FIG. 1 has been addressed in the context of a MWD application, it is not so limited and may be applied to wireline applications.

Figure 2:
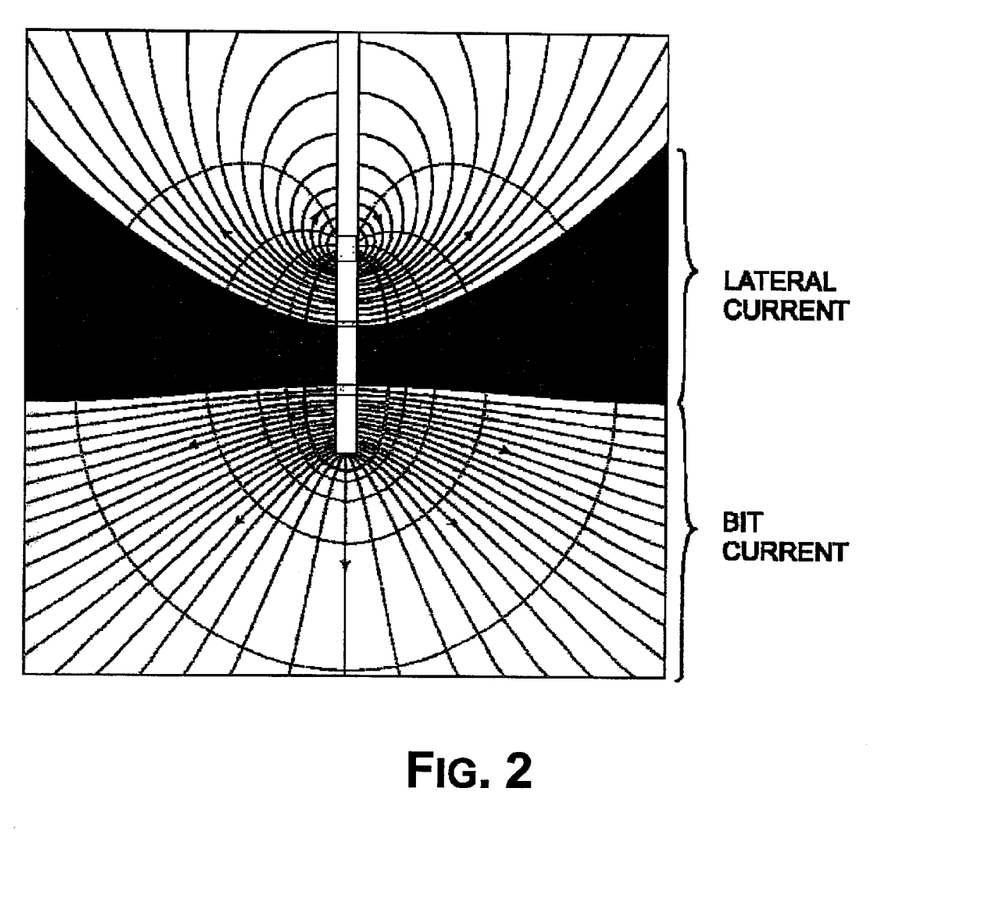
FIG. 2 shows a theoretical formation current flow induced in an isotropic formation by a toroid tool of FIG. 1.

FIG. 2 shows current flow lines (and equipotential lines) indicated by numerical simulation for an isotropic formation. The lateral current $I_1$–$I_2$ is shown as well as the bit current $I_2$. Of course, these current lines will be different for anisotropic formations, but the general principle remains the same.

Figure 3:
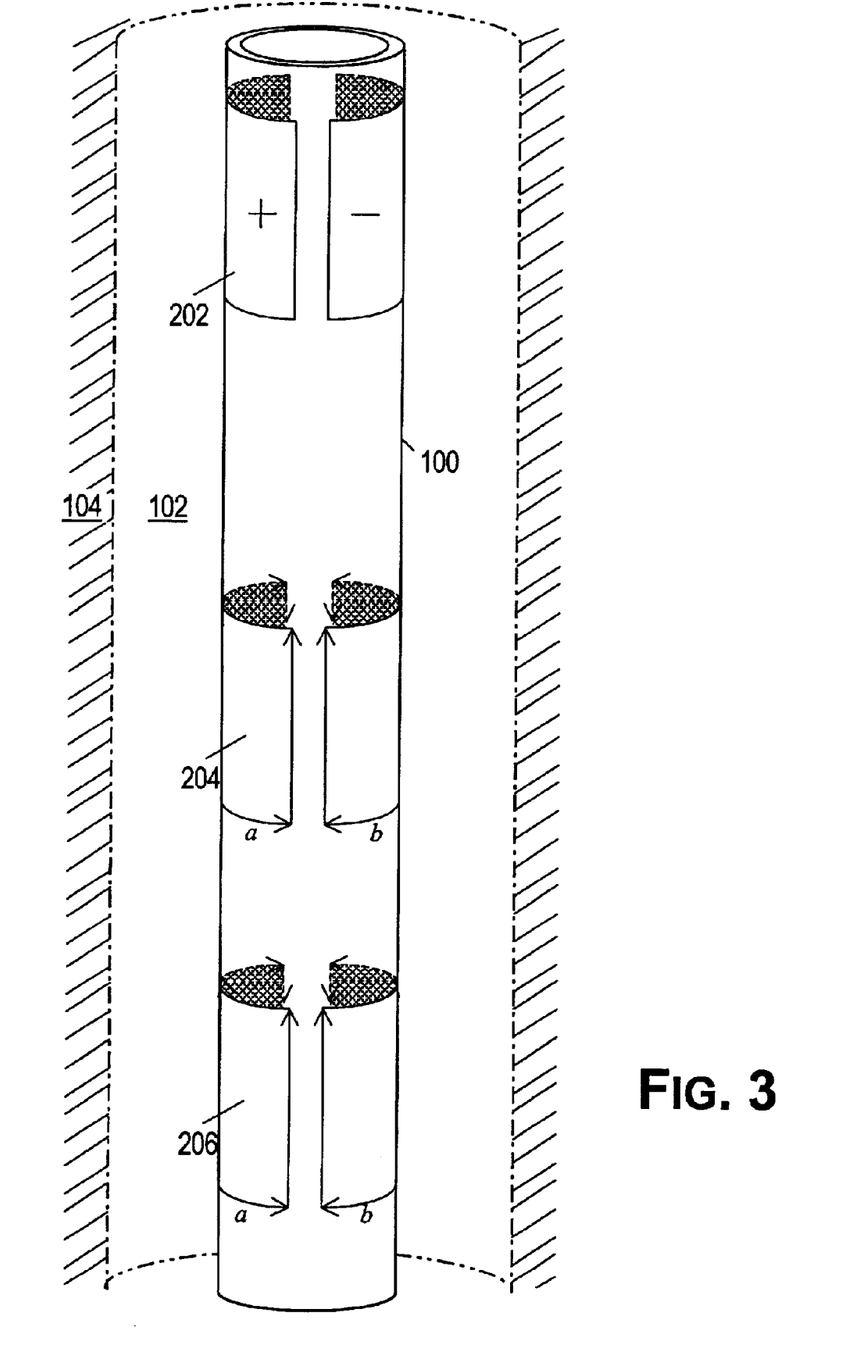
FIG. 3 shows another embodiment of the antenna configuration using alternate combinations of receivers and transmitters.

An alternate antenna configuration is shown in FIG. 3, where alternate antenna combinations of horizontal electric dipoles (HED) and horizontal magnetic dipoles (HMD) are used. A BED antenna includes two wires oriented opposite each other. Each wire in the BED represents a pole (e.g., a positive pole and a negative pole), such that as an electromotive force is applied to the BED, an electric field is generated. A HMD antenna includes a coil of wire having two ends where an electromotive force is applied that in turn generates a magnetic field. The magnetic field orients itself to the dipoles of the HMD in a similar manner that the electric field orients itself to the dipoles of the HED. Akin to FIG. 1, FIG. 3 shows a logging tool 100 that is part of a drillstring located in a wellbore 102 that passes through a formation 104. The tool includes at least one transmitter antenna 202, which preferably is a HED. Also there are at least two receiver antennas 204 and 206 both configured as HMD. As one ordinary of skill in the art having the benefit of this disclosure will appreciate, the system described in FIG. 3 is generally applicable to wireline applications, however it may also be applicable to MWD applications.

The transmitter 202 operates when an alternating voltage is applied to it and electric fields are generated in the formation 104. The electric fields induced in the formation 104 by the transmitter 202 bring about currents. Since the formation 104 is both reactive and resistive, there are resistive currents induced that are in phase, and reactive currents that are in quadrature (i.e., 90° out of phase). These currents further induce magnetic fields in the formation 104 that are proportional to the amount of resistance and/or reactance present. The induced magnetic fields are measured at various positions along the logging tool 100 by the receiver 204 and the receiver 206.

The receivers 204 and 206 preferably are fashioned such that the coil is formed around the periphery the cylindrical sections a and b as indicated by the directional arrows. In general, receivers 204 and 206 provide a measurable voltage in coils a and b that is proportional to the magnetic field passing through them. Receivers 204 and 206 preferably operate in a differential manner such that the voltage appearing in coils a and b of receiver 204 minus the voltage appearing in coils a and b of receiver 206 is the desired measurement.

It should be noted that although FIG. 3 shows a specific combination using a HED for the transmitter and two HMDs for the receivers, a converse arrangement would be evident to one of ordinary skill in this art in having the benefit of this disclosure. For example, a HMD may be used as the transmitter while HEDs may be used as the differential receivers. Furthermore, additional receivers may be fashioned along the logging tool to provide measurements at different effective depths in the formation. Also, the receivers and/or transmitters may be azimuthally tunable resistivity measurement tools as described in commonly owned U.S. Pat. No. 6,181,138. In this manner, specific coil configurations can be synthesized to provide the optimum transmit and receive structures in accordance with the preferred embodiments disclosed herein.

The apparent conductivity of the formation, is a function of the voltages measured by the two receiver antennas. The voltages measured from each receiver has an in-phase component up resulting from resistive formations and a quadrature component resulting from reactive components. The apparent conductivity may preferably be calculated from the difference between the in-phase voltages measured by the receiver antennas:

$$\sigma_a = K(V_2 - V_1), \tag{2}$$

where $V_1$ and $V_2$ are the voltages received in-phase with the transmitter signal ("resistive component"), and K is a constant for the logging tool. It should be noted that determining the apparent conductivity and/or calculating the anisotropy coefficient as described above may be done by either the logging tool or the processing equipment located at the surface (not shown in the drawings.)

Figure 4:
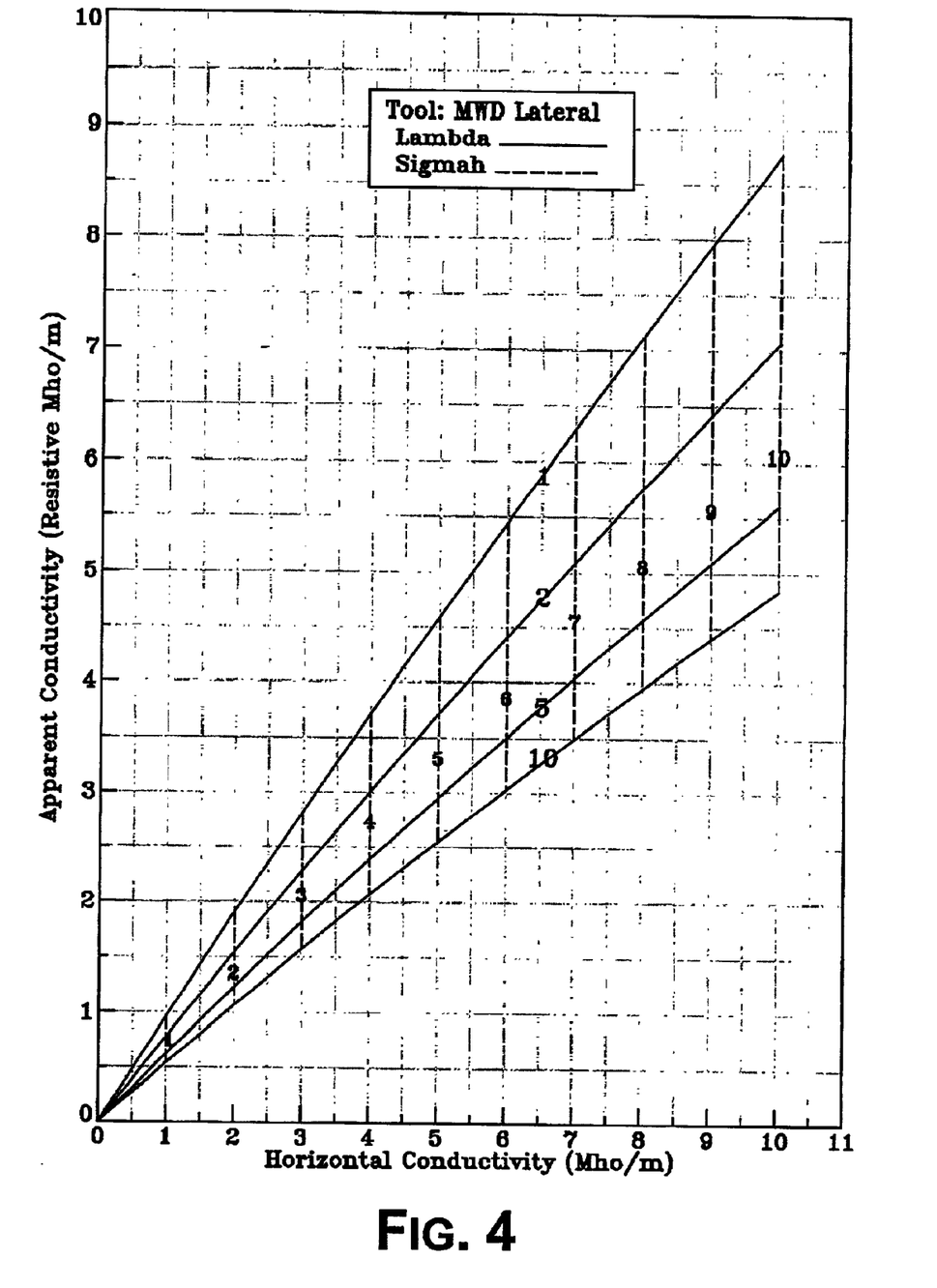
FIG. 4 is a graph relating apparent conductivity to horizontal conductivity for different formation anisotropies.

As shown in FIG. 4, the apparent conductivity is a function of both the horizontal conductivity and the anisotropy coefficient of Equation (1). In the preferred embodiment of the tool 100, an unrelated method is used to determine the horizontal conductivity. For example, a standard induction tool may be used to measure the $\sigma_h$. With the horizontal conductivity measurement from the unrelated source and the apparent conductivity measurement from the present logging tool, the anisotropy coefficient can be determined from the function shown in FIG. 4. The vertical conductivity can then be determined from the horizontal conductivity measurement and the anisotropy coefficient.

Figure 5:
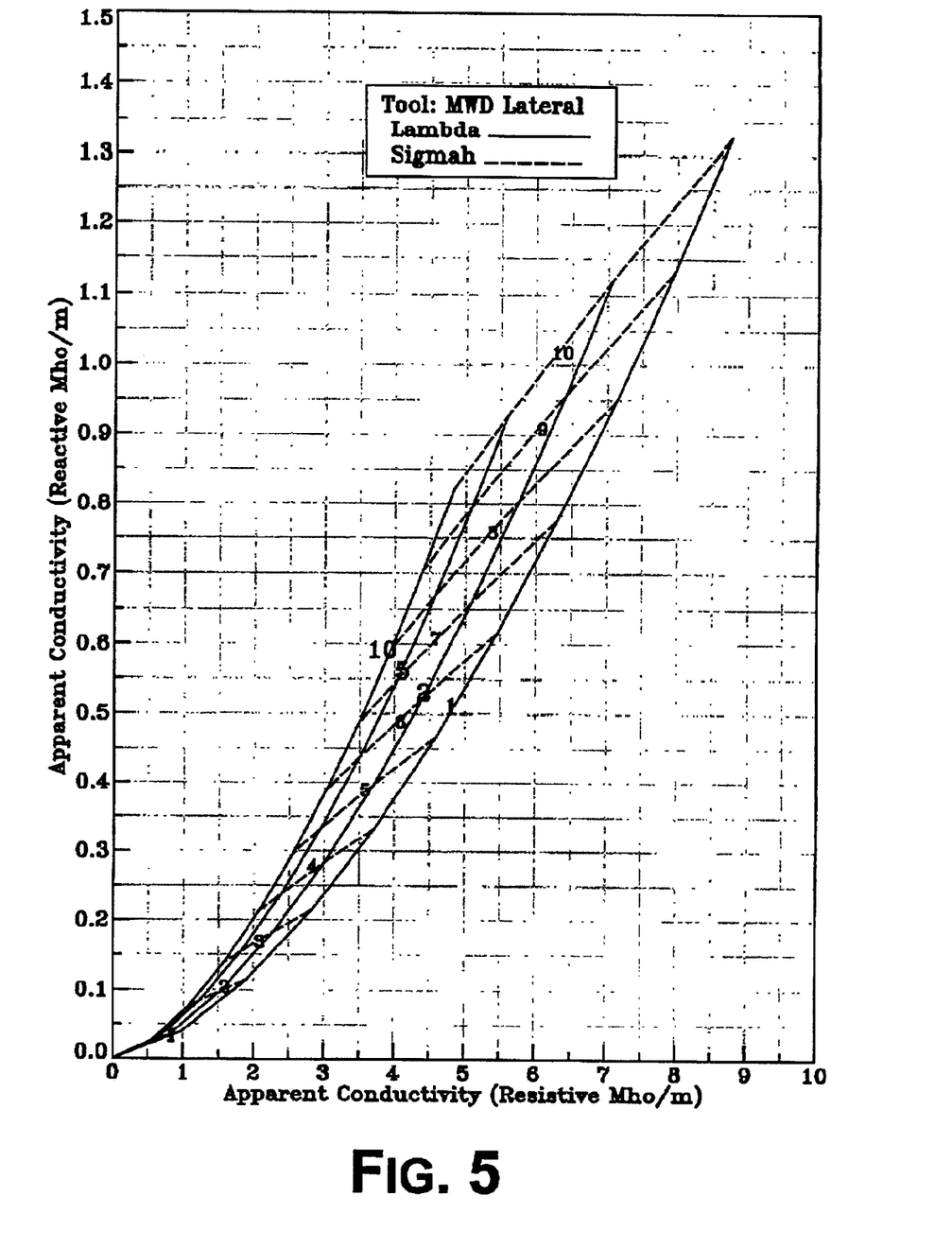
FIG. 5 is a graph relating apparent resistivity to apparent reactivity for different formation anisotropies.

If a separate determination of horizontal conductivity is unavailable or infeasible, then the present logging tool can be configured to determine the apparent conductivity from the reactive components of the receiver signals in addition to the apparent conductivity from the resistive components of the receiver signals. From the resistive and reactive apparent conductivities, both the horizontal conductivity and the anisotropy coefficient can be determined as shown in FIG. 5. From these values, the vertical conductivity may be calculated.

Figure 6:
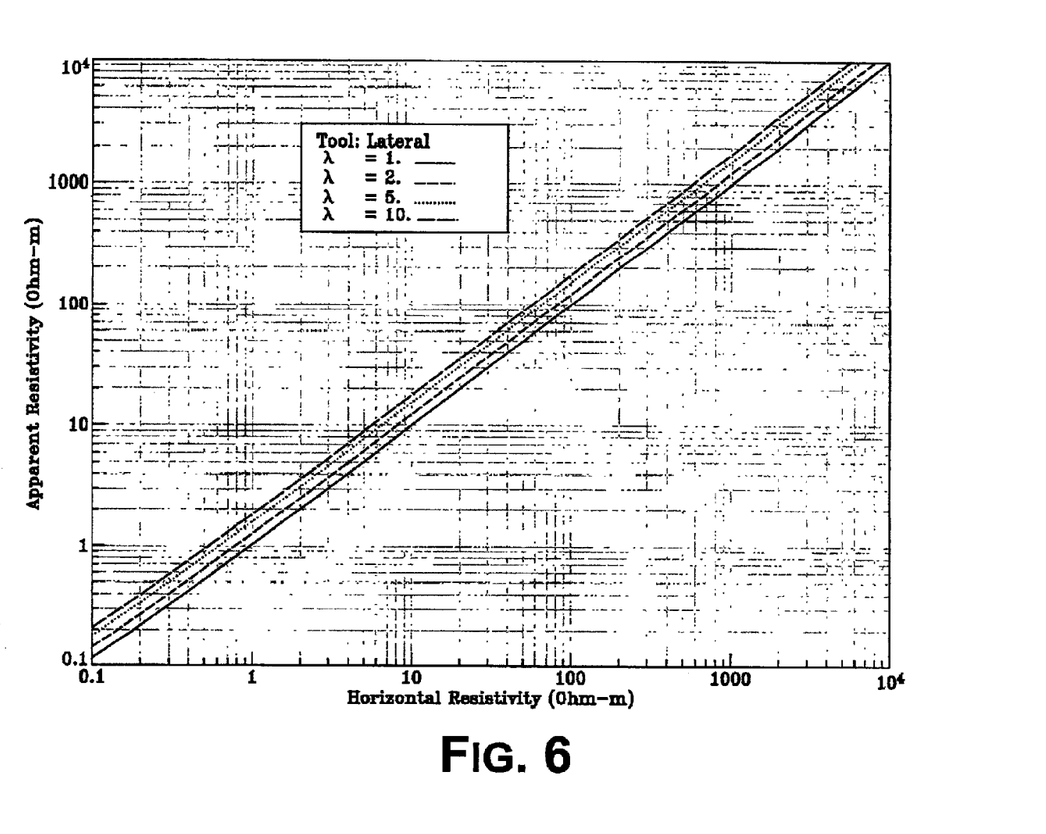
FIG. 6 is a graph relating horizontal resistivity to apparent resistivity for different formation anisotropies.

FIG. 6 shows the function of FIG. 4 on a logarithmic scale with different axes. The apparent resistivity (the inverse of conductivity) measured by the tool is shown as a function of the horizontal resistivity of the formation. Here it may be observed that a ten-fold increase in anisotropy yields a 75% change in the apparent resistivity. Accordingly if the method of FIG. 5 is used, there may be some loss of sensitivity in high-resistivity formations. This sensitivity problem might be aggravated by a loss of amplitude in the reactive voltage caused by a reduced skin-effect in highly resistive formations.

Figure 7:
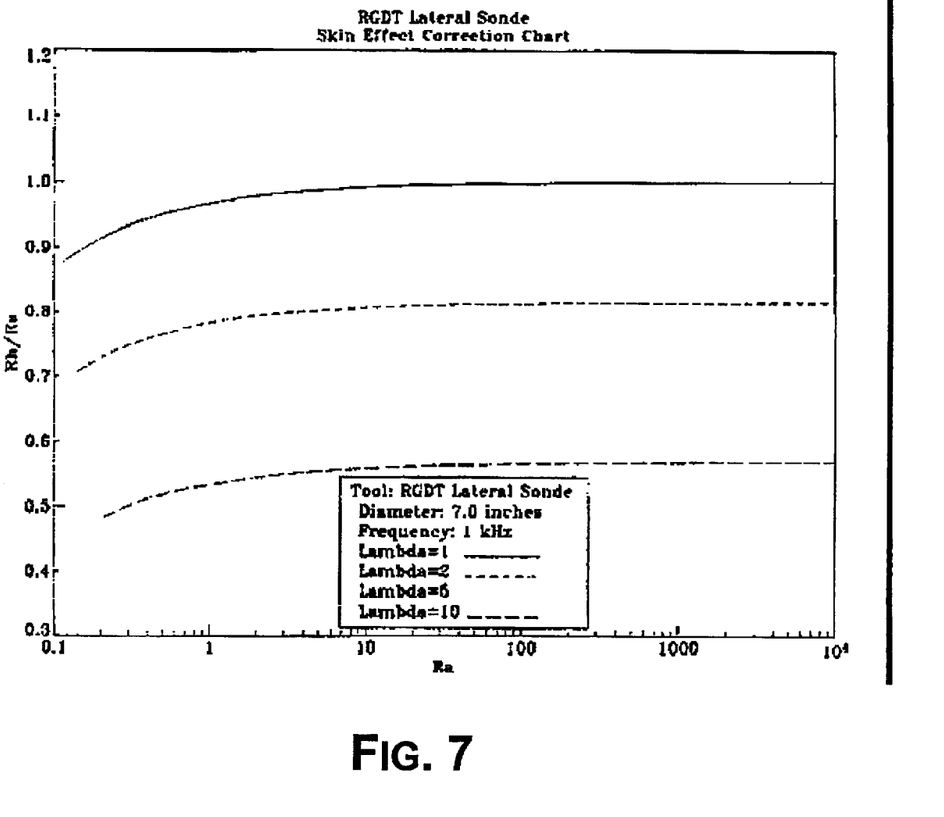
FIG. 7 shows the information of FIG. 6 in a different form.

A different presentation of the same data set as in FIG. 6 can be made in the form of a skin effect correction chart as in FIG. 7. It is clear that at normal operating frequencies the toroidal tool has only a modest amount of skin effect which is easily corrected. In fact, if the appropriate skin effect correction is applied, the apparent resistivity Ra of the tool is approximated within a few percent error:

$$R_a = \lambda^{1/4} R_h. \quad (3)$$

Note that in FIG. 2, the current flow lines (initially) run perpendicular to the drillstring. This advantageously reduces the borehole and invasion effects on the measurement and enhances the depth of investigation. The proposed tool is expected to work particularly well in salty muds where the existing tools are deficient. The tool operates on straightforward principles, and accordingly is expected have advantages over existing tools in terms of cost and ease of interpretation.

Theory of Operation

In accompaniment with the preferred embodiments, the following analysis serves as a theoretical guide. Referring first to a vertical toroid (VTR) transmitter and a VTR receiver system where the VTRs are assumed to behave as point toroids, magnetic coupling (for a wireline application) can be expressed in units of apparent conductivity:

$$\sigma_a + i\sigma_x = \frac{\sigma_v}{\lambda^2}(1 - ik_h L)e^{ik_h l}, \quad (4)$$

$$\rightarrow \frac{\sigma_v}{\lambda^2}, \quad (5)$$

where the limiting form of Equation (5) represents the response in the absence of skin effect.

Focusing now on the case of RMD transmitters and HED receivers, the electric coupling can be shown to be:

$$\sigma_a + i\sigma_x = \frac{\sigma_h}{k_h^2 L^2}\left(\frac{1}{\lambda^2 + 1}\right)(1 - ik_h L)e^{ik_h L}, \quad (6)$$

$$\rightarrow \frac{\sigma_v}{\lambda^2}, \quad (7)$$

where the limiting form of Equation (7) represents the response in the absence of skin effect. Also, in the case of HED transmitters and HMD receivers, the magnetic coupling can be shown to be identical to Equations (6) and (7). It should be noted from the above analysis, that electric coupling measured by an electric dipole receiver can be replaced with a measurement of the magnetic field by a coil whose receiver plane is orthogonal to the electric dipole antenna, thus different combinations of horizontal versus vertical and magnetic versus electric dipole configurations are supported by this analysis. In addition, Equations (4)–(7) illustrate the perceived benefits of using the embodiments of FIG. 1 and FIG. 3 in measuring $\sigma_v$ as well as measuring overall anisotropy.

Numerous variations and modifications will become apparent to those skilled in the art once the above disclosure is fully appreciated. It is intended that the following claims be interpreted to embrace all such variations and modifications.

What is claimed is:

1. A method comprising:

transmitting a signal into a formation using a toroidal transmitter;

measuring the signal difference between two toroidal receiver antennas on a tool in a borehole traversing the formation;

determining an apparent conductivity of the formation from a resistive component of the signal difference;

using the apparent conductivity to calculate anisotropy coefficient; and calculating the vertical conductivity.

2. The method of claim 1, further comprising:

determining a second apparent conductivity of the formation from a reactive component of the signal difference; and using both apparent conductivities to calculate the anisotropy coefficient.

3. The method of claim 2, further comprising:

using both apparent conductivities to calculate the horizontal conductivity.

4. A method comprising:

transmitting a signal into the formation using a toroidal transmitter;

measuring the signal difference between two toroidal receiver antennas on a tool in a borehole traversing the formation;

determining an apparent conductivity of the formation from a resistive component of the signal difference;

using the apparent conductivity to calculate anisotropy coefficient;

determining a second apparent conductivity of the formation from a reactive component of the signal difference;

using both apparent conductivities to calculate the anisotropy coefficient; and using both apparent conductivities to calculate the vertical conductivity.

5. A method comprising:

transmitting a signal into the formation using a toroidal transmitter;

measuring the signal difference between two toroidal receiver antennas on a tool in a borehole traversing the formation;

determining an apparent conductivity of the formation from a resistive component of the signal difference;

using the apparent conductivity to calculate anisotropy coefficient;

determining a second apparent conductivity of the formation from a reactive component of the signal difference;

using both apparent conductivities to calculate the anisotropy coefficient; and calculating the vertical conductivity from the anisotropy coefficient and the horizontal conductivity.

6. An apparatus for comprising:

a toroidal transmitter that transmits signals into a formation; and a plurality of toroidal receivers coupled to the toroidal transmitter that receive the signals, wherein the signal difference between two toroidal receivers is measured;

wherein an apparent conductivity of the formation is determined using the resistive component of the signal difference;

wherein the apparent conductivity is used to calculate anisotropy coefficient; and wherein the anisotropy coefficient is used to determine vertical conductivity.

7. The apparatus of claim 6, wherein a second apparent conductivity of the formation is determined from a reactive component of the signal difference and both apparent conductivities are used to calculate the anisotropy coefficient.

8. The apparatus of claim 7, wherein both apparent conductivities are used to calculate the horizontal conductivity.

9. An apparatus comprising:
a toroidal transmitter that transmits signals into a formation; and
a plurality of toroidal receives coupled to the toridal Transmitter that receive the signals, wherein the signal difference between two toroidal receivers is measured;
wherein an apparent conductivity of the formation is determined using a resistive component of the signal difference;
wherein the apparent conductivity is used to calculate anisotropy coefficient;
wherein a second apparent conductivity of the formation is determined from a reactive component of the signal difference and both apparent conductivities are used to calculate the anisotropy coefficient; and
wherein both apparent conductivities are used to calculate the vertical conductivity.

10. An apparatus comprising:
a toroidal transmitter that transmits signals into a formation; and
a plurality of toroidal receivers coupled to the toroidal transmitter that receive the signals, wherein the signal difference between two toroidal receivers is measured;
wherein an apparent conductivity of the formation is determined using the resistive component of the signal difference;
wherein the apparent conductivity is used to calculate anisotropy coefficient;
wherein a second apparent conductivity of the formation is determined from a reactive component of the signal difference and both apparent conductivities are used to calculate the anisotropy coefficient; and
wherein the vertical conductivity is calculated from the anisotropy coefficient and the horizontal conductivity.

11. A system comprising:
a downhole logging tool further comprising:
a toroidal transmitter that transmits signals into a formation; and
a plurality of toroidal receivers coupled to the toroidal transmitter that receive the signals, wherein a signal difference between two toroidal receivers is measured;
wherein an apparent conductivity of the formation is determined using a resistive component of the signal difference;
wherein the apparent conductivity is used to calculate anisotropy coefficient; and
wherein the vertical conductivity is determined using the anisotropy coefficient.

12. The system of claim 11, wherein a second apparent conductivity of the formation is determined from a reactive component of the signal difference and both apparent conductivities are used to calculate the anisotropy coefficient.

13. The system of claim 12, wherein both apparent conductivities are used to calculate the horizontal conductivity.

14. A system comprising:
a downhole logging tool further comprising:
a toroidal transmitter that transmits signals into a formation; and
a plurality of toroidal receivers coupled to the toroidal transmitter that receive the signals, wherein a signal difference between two toroidal receivers is measured;
wherein an apparent conductivity of the formation is determined using a resistive component of the signal difference;
wherein the apparent conductivity is used to calculate anisotropy coefficient;
wherein a second apparent conductivity of the formation is determined from the reactive component of the signal difference and both apparent conductivities are used to calculate the anisotropy coefficient; and
wherein both apparent conductivities are used to calculate the vertical conductivity.

15. A system comprising:
a downhole logging tool further comprising:
a toroidal transmitter that transmits signals into a formation; and
a plurality of toroidal receivers coupled to the toroidal transmitter that receive the signals, wherein a signal difference between two toroidal receivers is measured;
wherein an apparent conductivity of the formation is determined using a resistive component of the signal difference;
wherein the apparent conductivity is used to calculate anisotropy coefficient;
wherein a second apparent conductivity of the formation is determined from a reactive component of the signal difference and both apparent conductivities are used to calculate the anisotropy coefficient; and
wherein the vertical conductivity is calculated from the anisotropy coefficient and the horizontal conductivity.

16. A method comprising:
transmitting a signal into a formation using a horizontal electric dipole transmitter; measuring the signal using at least one horizontal magnetic dipole receiver;
determining an apparent conductivity of the formation from a resistive
component of the measured signal;
using the apparent conductivity to calculate anisotropy coefficient; and
determining the vertical conductivity.

17. The method of claim 16, further comprising:
determining a second apparent conductivity of the formation from a reactive
component of the measured signal; and
using both apparent conductivities to calculate the anisotropy coefficient.

18. The method of claim 17, further comprising:
using both apparent conductivities to calculate the horizontal conductivity.

19. A method comprising:
transmitting a signal into a formation using a horizontal electric dipole transmitter;
measuring the signal difference between two horizontal magnetic dipole receivers;
determining an apparent conductivity of the formation from a resistive component of the signal difference;
Using the apparent conductivity to calculate anisotropy coefficient; and
determining the vertical conductivity.

20. A method comprising:
transmitting a signal into a formation using a horizontal electric dipole transmitter;
measuring the signal using at least one horizontal magnetic dipole receiver;

determining an apparent conductivity of the formation from a resistive component of the measured signal;

using the apparent conductivity to calculate anisotropy coefficient;

determining a second apparent conductivity of the formation from a reactive component of the measured signal;

using both apparent conductivities to calculate the anisotropy coefficient; and using both apparent conductivities to calculate the vertical conductivity.

21. A method comprising:

transmitting a signal into a formation using a horizontal electric dipole transmitter;

measuring the signal using at least one horizontal magnetic dipole receiver;

determining an apparent conductivity of the formation from a resistive component of the measured signal;

using the apparent conductivity to calculate anisotropy coefficient;

determining a second apparent conductivity of the formation from a reactive component of the measured signal;

using both apparent conductivities to calculate the anisotropy coefficient; and calculating the vertical conductivity from the anisotropy coefficient and the horizontal conductivity.

22. An apparatus for determining electrical anisotropy of a formation, comprising:

a horizontal electric dipole transmitter that transmits signals into a formation; and at least one horizontal magnetic dipole receiver coupled to the transmitter that receives the signals, wherein the signal is measured;

wherein an apparent conductivity of the formation is determined using the resistive component of the measured signal; and wherein the apparent conductivity is used to calculate anisotropy coefficient.

23. The apparatus of claim 22, wherein a second apparent conductivity of the formation is determined from a reactive component of the measured signal and both apparent conductivities are used to calculate the anisotropy coefficient.

24. The apparatus of claim 23, wherein both apparent conductivities are used to calculate the horizontal conductivity.

25. The apparatus of claim 23, wherein both apparent conductivities are used to calculate the vertical conductivity.

26. The apparatus of claim 23, wherein the vertical conductivity is calculated from the anisotropy coefficient and the horizontal conductivity.

27. An apparatus for determining electrical anisotropy of a formation, comprising:

a horizontal electric dipole transmitter that transmits signals into a formation; and at least two horizontal magnetic dipole receivers coupled to the transmitter that receive the signals, wherein a signal difference between the two horizontal magnetic dipole receivers is measured;

wherein an apparent conductivity of the formation is determined using a resistive component of the signal difference; and wherein the apparent conductivity is used to calculate anisotropy coefficient.

28. A system for determining electrical anisotropy of a formation while drilling the formation, comprising:

a downhole logging tool further comprising:

a horizontal electric dipole transmitter that transmits signals into the formation; and at least one horizontal magnetic dipole receiver coupled to the transmitter that receives the signals, wherein the signals are measured;

wherein the apparent conductivity of the formation is determined using the resistive component of the measured signal; and wherein the apparent conductivity is used to calculate anisotropy coefficient.

29. The system of claim 28, wherein a second apparent conductivity of the formation is determined from a reactive component of the measured signal and both apparent conductivities are used to calculate the anisotropy coefficient.

30. The system of claim 29, wherein both apparent conductivities are used to calculate the horizontal conductivity.

31. The system of claim 29, wherein both apparent conductivities are used to calculate the vertical conductivity.

32. The system of claim 29, wherein the vertical conductivity is calculated from the anisotropy coefficient and the horizontal conductivity.

33. A method for determining electrical anisotropy of a formation, wherein the method comprises:

transmitting a signal into the formation using a horizontal magnetic dipole transmitter;

measuring the signal using at least one horizontal electric dipole receiver;

determining an apparent conductivity of the formation from a resistive component of the measured signal; and using the apparent conductivity to calculate anisotropy coefficient.

34. The method of claim 33, further comprising:

determining a second apparent conductivity of the formation from a reactive component of the measured signal; and using both apparent conductivities to calculate the anisotropy coefficient.

35. The method of claim 34, further comprising:

using both apparent conductivities to calculate the horizontal conductivity.

36. The method of claim 34, further comprising:

using both apparent conductivities to calculate the vertical conductivity.

37. The method of claim 34, further comprising:

calculating the vertical conductivity from the anisotropy coefficient and the horizontal conductivity.

38. The method of claim 33, further comprising measuring the signal difference between two horizontal electric dipole receivers and determining the apparent conductivity of the formation from the resistive component of the signal difference.

39. An apparatus for determining electrical anisotropy of a formation, comprising:

a horizontal magnetic dipole transmitter that transmits signals into the formation; and at least one horizontal electric dipole receiver coupled to the transmitter that receives the signals, wherein the signal is measured;

wherein the apparent conductivity of the formation is determined using a resistive component of the measured signal; and wherein the apparent conductivity is used to calculate anisotropy coefficient.

40. The apparatus of claim 39, wherein a second apparent conductivity of the formation is determined from a reactive component of the measured signal and both apparent conductivities are used to calculate the anisotropy coefficient.

41. The apparatus of claim 40, wherein both apparent conductivities are used to calculate the horizontal conductivity.

42. The apparatus of claim 40, wherein both apparent conductivities are used to calculate the vertical conductivity.

43. The apparatus of claim 40, wherein the vertical conductivity is calculated from the anisotropy coefficient and the horizontal conductivity.

44. The apparatus of claim 39, further comprising measuring the signal difference between two horizontal electric dipole receiver antennas and determining the apparent conductivity of the formation from the resistive component of the signal difference.

45. A system for determining electrical anisotropy of a formation while drilling the formation, comprising:
- a downhole logging tool further comprising:
    - a horizontal magnetic dipole transmitter that transmits signals into the formation; and
    - at least one horizontal electric dipole receiver coupled to the transmitter that receives the signals, wherein the signals are measured;
- wherein the apparent conductivity of the formation is determined using a resistive component of the measured signal; and
- wherein the apparent conductivity is used to calculate anisotropy coefficient.

46. The system of claim 45, wherein a second apparent conductivity of the formation is determined from a reactive component of the measured signal and both apparent conductivities are used to calculate the anisotropy coefficient.

47. The system of claim 46, wherein both apparent conductivities are used to calculate the horizontal conductivity.

48. The system of claim 46, wherein both apparent conductivities are used to calculate the vertical conductivity.

49. The system of claim 46, wherein the vertical conductivity is calculated from the anisotropy coefficient and the horizontal conductivity.

50. A tool comprising:
- a transmitter means for transmitting a signal into the formation;
- a differential receiving means coupled tothe transmitter means for measuring a signal difference; and
- a calculating means coupled to the receiving means for determining an apparent conductivity of the formation from a resistive component of the signal difference;
- wherein the apparent conductivity is used to calculate anisotropy coefficient; and
- wherein the vertical conductivity is determined using said anisotropy coefficient.

* * * * *